United States Patent Office 3,781,272
Patented Dec. 25, 1973

3,781,272
TRIPEPTIDE
George Rogelio Flouret, Waukegan, Ill., assignor to Abbott Laboratories, North Chicago, Ill.
No Drawing. Filed Mar. 24, 1972, Ser. No. 237,877
Int. Cl. C07c *103/52*
U.S. Cl. 260—112.5                              8 Claims

ABSTRACT OF THE DISCLOSURE

The new blocked tripeptide Y-($N^\omega$-R')Arg-Pro-Gly-R wherein R is hydroxy, methoxy or amino, R' is a suitable blocking group and Y is hydrogen or an easily removable protective group has been found to be a valuable intermediate for the preparation of large peptide chains, such as for instance, the decapeptide Gn-RH.

DETAILED DESCRIPTION OF THE INVENTION

Recent discovery of the aminoacid sequence of the gonadotropin (Gn)-relasing hormone (RH) has made it highly desirable to produce this substance on a practical scale in a purity sufficient to use the substance therapeutically in instances of hormone deficiencies and possibly as a regulating agent for the ovulation cycle in female warm-blooded animals. For instance, it has been found that small doses of Gn-RH, administered by intravenous injections to female sheep in the anestrus cycle, produces ovulation. The formula of the Gn-RH has been identified with the aminoacid sequence pyroGlu-His-Trp-Ser-Tyr-Gly-Leu-Arg-Pro-Gly-$NH_2$ but in order to make such a large molecule from simple, single aminoacids, a considerable number of steps including several condensation reactions are required. In order to assure such condensations to take place at the desired sites, other active sites or functional groups on the molecule might be conveniently protected by some groups that can be removed at will.

A relatively simple method has now been devised to produce the desired aminoacid chain in surprisingly good yields. The new methods involves a minimum of group-protecting and -removal reactions for such protective groups and employs a number of new intermediates which are important stepping stones for making Gn-RH and other peptides.

For the purpose of the present disclosure, it is to be understood that all aminoacids used herein are in their optically active L-form except for glycine.

It has now been found that in order to prepare the decapeptide referred to above, various new intermediates are necessary to accomplish the most practical synthesis for such large peptides. These intermediates require so-called protecting groups on those functional groups that may interfere with the desired coupling reaction that extends the peptide chain to a larger number of aminoacids. Such a protective group has to be bound sufficiently strongly to the aminoacid's functional group that it will remain attached thereto when the blocking group at the $N^\alpha$-position is removed in order to make that site reactive for coupling with a chain-extending aminoacid. By properly selecting these protective groups, other $N^\alpha$-blocked aminoacids can be attached to the $N^\alpha$-position of the present polypeptide and all protective groups can be removed at the point where the desired chain is completed.

The present invention is directed to a small peptide chain that contains a blocking group that fulfills the above requirement. It is therefore the main object of the present invention to provide a tripeptide of the formula Y-($N^\omega$-R')Arg-Pro-Gly-R wherein R represents hydroxy, methoxy or the amino group, R' is a blocking group that protects the imino group of the arginine moiety and can be removed by a simple chemical step that leaves the aminoacid bonds intact, and Y is hydrogen or a protective group that can be removed by a simple, mild chemical treatment which leaves the remainder of the molecule intact. More specifically, where Y is different from hydrogen, it is tert.-butoxycarbonyl (BOC), o-nitrophenylsulfenyl (NPS), 2-(diphenyl)isopropyloxycarbonyl, benzyloxycarbonyl (CBZ) or phthalyl. R' may be nitro, p-nitrobenzyloxycarbonyl, tetrachloroisopropyloxyphthaloyl or p-tolylsulfonyl (tos.). Among these, nitro or tos. groups are preferred because they are removable by a simple treatment with catalytic hydrogenation or hydrofluoric acid. Others mentioned must be removed by more complex reactions.

In a simple embodiment, the new compounds of the present invention are prepared by reacting BOC-proline p-nitrophenyl ester with glycinamide or glycine methyl ester, preferably by using an excess of the latter, and the obtained protected dipeptide is converted to Pro-Gly-R by a mild acid treatment. The free dipeptide is then reacted with BOC-($N^\omega$-R')-Arg in the presence of dicyclohexylcarbodiimide and an inert solvent. After removing the formed dicyclohexylurea, the mixture is stripped of the solvent and the residue is purified by chromatography. The $N^\alpha$-BOC group can be removed easily by a mild acid treatment in an inert organic medium, while retaining the blocking group R'. Where R is methoxy, the free acid is obtained by hydrolysis in known manner.

In order to illustrate the method for obtaining the compounds of the present invention, reference is made to the following examples which are, however, not to be interpreted as limiting the scope of this invention in any respect.

Example 1

A solution of 514 mg. of prolylglycinamide in 8 ml. of pyridine is mixed at room temperature with 619 mg. of dicyclohexylcarbodiimide and 106.2 mg. of $N^\alpha$-benzyloxycarbonyl-$N^\omega$-nitroarginine. After 16 hours, the formed dicyclohexylurea is filtered off and the filtrate is evaporated resulting in an oil. This oil is placed on a chromatographic column containing 35 g. of silica gel using 5% methanolic chloroform as the solvent. Elution of the column with 5% methanolic chloroform removes some of the impurities contained in the crude product. The pure material is eluted when the methanol concentration is increased to 15%. By combining the appropriate fractions and evaporation of the solvent, 1.319 g. (87% of theory) of pure CBZ-($N^w$-$NO_2$)Arg-Pro-Gly-$NH_2$ of undefined melting point is obtained. The material produces a correct elemental analysis and its NMR spectrum is consistent with the assigned structure. The compounds show $[\alpha]_D^{25}$ —25.4° (c.-1, DMF).

Similarly, the tripeptide is made wherein the CBZ-group is replaced with the BOC-group. However, this material again does not crystallize.

When the above Pro-Gly-$NH_2$ is replaced by an equimolar amount of Pro-Gly-$OCH_3$, the same reaction sequence yields the $N^\alpha$,$N^\omega$-diprotected Arg-Pro-Gly-$OCH_3$ which is hydrolyzed at room temperature in 6 hours with one molar equivalent of 1 N aqueous sodium hydroxide using a mixture of dimethylformamide/dioxan 1:1 as the solvent for the diprotected Arg-Pro-Gly-$OCH_3$ to Arg-Pro-Gly-OH carrying the selected blocking groups in the $N^\alpha$-positions of Arg.

Example 2

A solution of 1.013 g. of CBZ-($N^\omega$-$NO_2$)Arg-Pro-Gly-$NH_2$ from Example 1 in 8 ml. of acetic acid is treated with 8 ml. of 32% hydrobromic acid in acetic acid. After one hour, the solution is added to ether and the precipitate is separated, washed five times by suspending it in ether and decanting the supernatant from the solid. The solid is then treated in methanol with an ion exchange resin in its OH-form and the resulting suspension is filtered. The resin is washed with 10% acetic acid in methanol and the combined wash liquor and filtrate is evaporated to a solid of undefined melting point. The elemental analysis confirms the expected structure ($N^\omega$-$NO_2$)Arg-Pro-Gly-$NH_2$ which shows a single spot on TLC with $R_f$ 0.15 in 15% methanol/chloroform.

By replacing (CBZ)-($N^\omega$-$NO_2$)Arg-Pro-Gly-$NH_2$ with the corresponding BOC- protected tripeptide amide or the corresponding $N^\omega$-tos. analogues from Example 1, the above procedure yields ($N^\omega$-$NO_2$)Arg-Pro-Gly-$NH_2$ or ($N^\omega$-tos.)Arg-Pro-Gly-$NH_2$, respectively. In all instances, the $N^\alpha$-deprotection step produces a yield of >90% of theory.

The new tripeptide is extremely useful as an intermediate for making longer peptide chains, as for instance in Gn-RH and is particularly well suited as a precursor in such a synthesis because of its optical configuration with Pro and Arg both being present in the L-form, and the retention of the protective group in the orginine moiety during the deblocking of the $N^\alpha$-position and during any desired subsequent coupling reactions with other aminoacids. During such deblocking and coupling reactions, the new intermediate is chemically and optically stable, i.e., no racemization takes place.

I claim:

1. The optically active L-form of the tripeptide Y-($N^\omega$-R')Arg-Pro-Gly-R wherein R is hydroxy, methoxy or amino, R' is nitro, p-nitrobenzyloxycarbonyl, tetrachloroisopropyloxyphthaloyl or p-tolylsulfonyl, and wherein Y is hydrogen, tert.-butoxycarbonyl, o-nitrophenylsulfenyl, 2-(diphenyl)isopropyloxycarbonyl, benzyloxycarbonyl or phthalyl.

2. The compounds of claim 1 wherein R is hydroxy, methoxy or amino, R' is p-toluenesulfonyl, p-nitrobenzyloxycarbonyl, tetrachloroisopropoxyphthaloyl, or nitro and Y is hydrogen, tert.-butoxycarbonyl, o-nitrophenylsulfenyl, phthalyl, benzoyloxycarbonyl or 2-(diphenyl)-isopropyloxycarbonyl.

3. The compound of claim 2 wherein R is amino, R' is nitro and Y is hydrogen.

4. The compound of claim 2 wherein R is amino, R' is p-toluenesulfonyl and Y is hydrogen.

5. The compound of claim 2 wherein R is amino, R' is p-toluenesulfonyl and Y is benzyloxycarbonyl.

6. The compound of claim 2 wherein R is amino, R' is toluenesulfonyl and Y is tert.-butoxycarbonyl.

7. The compound of claim 2 wherein R is amino, R' is nitro and Y is benzyloxycarbonyl.

8. The compound of claim 2 wherein R is amino, R' is nitro and Y is trert.-butoxycarbonyl.

References Cited

Biochemical and Biophysical Research Comm. (1971), vol. 45, No. 3, by Geiger et al., pp. 767–773 relied on.

ELBERT L. ROBERTS, Primary Examiner

Notice of Adverse Decision in Interference

In Interference No. 98,942, involving Patent No. 3,781,272, G. R. Flouret, TRIPEPTIDE, final judgment adverse to the patentee was rendered Jan. 31, 1978, as to claim 8.

[*Official Gazette August 8, 1978.*]